United States Patent [19]
Cohn

[11] 3,959,067
[45] May 25, 1976

[54] CONCENTRATION OF VOLATILES-BEARING PRODUCTS

[75] Inventor: Ruth Cohn, Ramat-Gan, Israel

[73] Assignee: The A.P.V. Company Limited, Crawley, England

[22] Filed: Dec. 6, 1974

[21] Appl. No.: 530,082

[52] U.S. Cl. ............................ 159/17 R; 159/20 R; 159/47 R; 426/386; 426/387
[51] Int. Cl.² ...................... B01D 1/26; A23F 3/00; A23F 5/00
[58] Field of Search........... 426/386, 387; 159/20 R, 159/47 R, 17 R

[56] References Cited
UNITED STATES PATENTS

| | | | |
|---|---|---|---|
| 2,262,519 | 11/1941 | Talton............................... | 159/20 R |
| 2,596,875 | 5/1932 | Stewart............................. | 159/20 R |
| 2,796,120 | 6/1957 | Lockman et al................ | 159/20 CS |
| 2,888,982 | 6/1959 | Ramen.............................. | 159/20 R |
| 2,941,590 | 6/1960 | Rosenblad....................... | 159/20 R |
| 3,061,448 | 10/1962 | Majonnier et al. ................ | 426/387 |
| 3,065,085 | 11/1962 | Chirico.............................. | 426/387 |
| 3,117,877 | 1/1964 | Byer et al. ......................... | 426/387 |

*Primary Examiner*—Norman Yudkoff
*Assistant Examiner*—J. Sofer
*Attorney, Agent, or Firm*—Christel & Bean

[57] ABSTRACT

In the process for the concentration of volatiles-bearing products by a low-temperature, short-time, multi-effect evaporation method, a forward feed of the product and vapor occurs so that at least from a given stage of evaporation, each subsequent stage of evaporation is carried out at a lower temperature. The volatile constituents, removed with the vapor from one or more effects and subsequently condensed and recovered, are combined with the partially concentrated product before a final stage or stages of evaporation at a temperature lower than that at which they were originally distilled off. Thus a more highly volatile fraction is again removed with the vapor in the said final stage or stages of evaporation.

6 Claims, 1 Drawing Figure

U.S. Patent  May 25, 1976  3,959,067
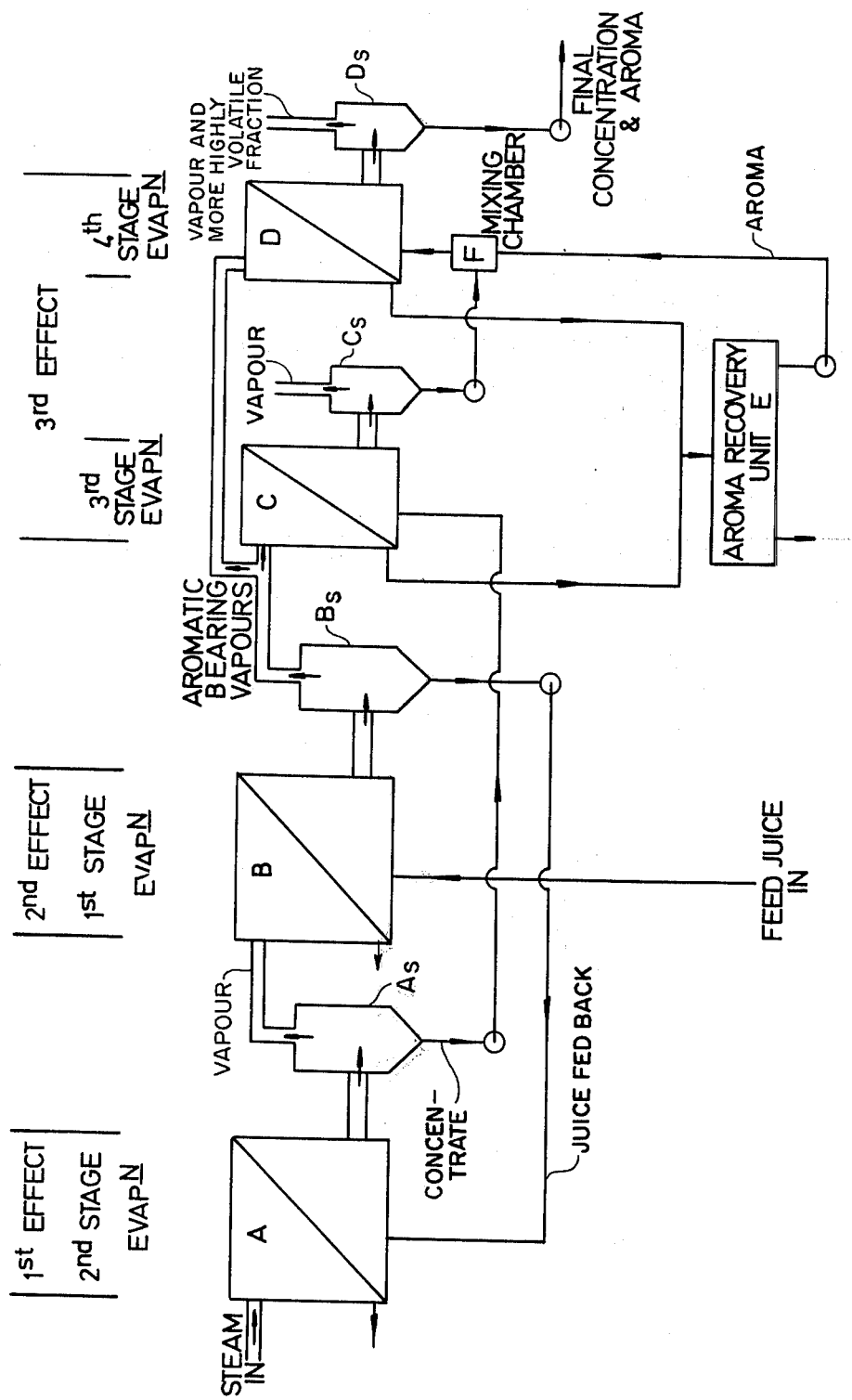

CONCENTRATION OF VOLATILES-BEARING PRODUCTS

This invention relates to the concentration, by evaporation, of products, such as fruit juices, containing volatile constituents.

Although the invention is hereinafter described primarily in connection with the concentration of fruit juices, it will be appreciated that it is more widely applicable and it is not intended to be limited to fruit juices.

Fruit juices, and especially citrus juices, are normally concentrated to reduce their bulk for storage and transport. The concentration is normally carried out using multi-effect vacuum evaporators. In order to operate in multi-effect and achieve high thermal economy, while at the same time minimising heat damage to the product, it is necessary to boil in the first effect at, say 170°F, the temperature dropping through the successive stages of evaporation until the final stage of evaporation is carried out at, say, 120°F.

During such an evaporation process the volatile constituents, which include the essential oils and aromas that contribute to the characteristic taste and smell of the juice, are distilled. The final product emerging from the evaporator, if it loses these volatile flavour components, therefore has a different flavour and aroma from that of the original juice.

In order to trap these desirable compounds, an aroma recovery unit is added to the vapour side of an appropriate evaporator stage. The two units, i.e. the evaporator and aroma recovery unit, although interconnected, operate independently producing two different products, one being the fruit juice concentrate, the other being a condensate which will be referred to briefly as aroma. The latter contains many constituents which generally separate into two phases, namely an oil phase with oil-soluble material and a water phase with water-soluble material.

Both phases are subject to oxidation and chemical decomposition on prolonged storage. Preferably the phases are stored separately and at low temperature because of this lack of stability. By reason of this instability, the aroma should not be mixed straight back into the concentrate after evaporation using conventional mixing methods, since off-flavours would be produced in the final product.

In order to obtain a good concentrate, i.e. one that when diluted approaches the quality of the original fruit juice, the aroma is added back to the concentrate after its dilution which may be some months later. The quality of the stored aroma varies for a number of reasons, and therefore some standardising may be necessary before the final mixing operation.

It is an object of this invention to provide a process whereby concentrated juice may be stored with the previously separated essence fraction without a deterioration in product quality. It has been found that using a low-temperature short-time multi-effect evaporator operated with a forward feed system, i.e. have a stage after which each subsequent stage of concentration is carried out at a lower temperature, then volatile constituents removed with the vapours from one or more effects of the evaporator and subsequently condensed may be advantageously combined with the partially concentrated fruit juice before the final stage or stages of evaporation. In this way the re-combined juice and flavour compounds present in the essence fraction are again subjected to a concentration stage, normally at the lowest temperature stage of the evaporator. Certain volatile substances are removed with the vapours leaving this stage of concentration but those remaining with the juice provide an excellent flavour to the product and avoid the stability problem normally experienced when the essence fraction is combined with the concentrate immediately at the end of the concentration stage.

Accordingly, the present invention consists in a process for the concentration of volatiles-bearing products by a low-temperature, short-time, multi-effect evaporation method, with a forward feed of the product and vapour so that at least from a given stage of evaporation, each subsequent stage of evaporation is carried out at a lower temperature, in which the volatile constituents, removed with the vapour from one or more effects and subsequently condensed and recovered, are combined with the partially concentrated product before a final stage or stages of evaporation at a temperature lower than that at which they were originally distilled off whereby a more highly volatile fraction is again removed with the vapour in the said final stage or stages of evaporation.

It has also been found that by having the first evaporation stage of the product at a temperature lower than that in the first effect of the evaporator, the volatiles can be boiled off with less heat damage, so the effect on flavour of the concentration is reduced.

In such a process on fruit juice, the raw juice is preheated to a temperature below that normally required for pasteurisation and fed to an intermediate effect in the evaporator, the volatiles removed with the vapour being condensed in a subsequent effect. After this first stage of concentration the juice is heated and held to give the required pasteurisation, and passed to the first effect of the evaporator. The recombination of essence and partially concentrated juice takes place before the final stage of concentration, i.e. at the low temperature end of the evaporator.

There are clear advantages in the process according to the invention is providing a juice of first class quality. Analysis reveals that the oil fraction of the volatile constituents is lowered when operating the improved process, and this contributes to the stability in that certain fractions including terpenes in the volatile constituents are preferentially removed in the low-temperature short-time final evaporation stage to which the combined juice and essence fraction has been subjected. An experimental trial showed that the described process will only increase the oil content of the concentrate from a maximum of 0.01% to 0.02% but with an increase of C.O.D. (Chemical Oxygen Demand) of from 120 to 160 parts per million indicating an increase in volatile constituents. Thus an improved concentrate is produced, whereas adding aroma in batch form to the final concentrate produces an unacceptably high oil content of 0.15% and a C.O.D. of 200 resulting in an excessively strong flavour. The process avoids the need for separate storage of the juice and flavour fraction, and furthermore avoids the necessary separation of the oil and water phases of that essence fraction.

Deterioration by oxidation is also avoided since the combining of the essence with the partial concentrate takes place within the total evaporator and essence system, i.e. under conditions which minimise oxygen pick-up.

Various forms of multi-effect evaporator may be employed and within an individual effect there may be multi-stage operation in order to ensure adequate wetting of the heat exchange surface.

The invention further consists in apparatus for carrying out the process according to the invention as set forth above, comprising a multi-effect evaporator with forward feed of the product, a recovery stage for condensing and recovering volatile constituents from the vapour from at least one effect, and a recombining stage upstream of a final stage or stages of evaporation in which the recovered volatiles may be mixed with the partial concentrate.

The invention will be further described with reference to the accompanying drawing of which the single FIG. is a diagrammatic illustration of plant for carrying out the process according to the invention including a triple-effect four-stage evaporator.

Each stage of the evaporator includes an evaporator receiving a heating medium, which is steam in the first effect and vapour from the preceding effect in the second and third effects, and a feed of product or partial concentrate. The concentrate and vapour from each stage A, B, C and D are separated in a separator As, Bs, Cs and Ds respectively.

Raw juices are fed into the second effect B, where the first stage evaporation takes place. The volatiles are boiled off at a lower temperature than in the first effect A, and so less harm is done to the essential oils and aromatics. The water vapour containing the aroma is fed to the third effect, which is divided into two series stages C and D, whereas the juice is fed back to the first effect A, where it is subjected to the highest temperature evaporation and pasteurisation and thence to the first stage C of the third effect and finally to the second stage D thereof where concentration is completed. The rolatile-rich vapour supplied to the third effect is partially condensed in the stages of that effect and passed with the uncondensed vapour to an aroma recovery unit E.

The recovered aroma is then pumped from the aroma recovering unit E to a mixing chamber F, where it is mixed with partially concentrated product from the first stage C of the third effect. The combined mixture is then fed to the second stage of the third effect, i.e. the final stage evaporation D, where some volatiles, and preferentially those in the oil fraction, are removed with the vapour.

Depending upon the flavour characteristics required in the juice and particularly the ratio of the oil-to-water volatile flavour fractions, the evaporator configuration, i.e. the number of stages or effects, and the point at which the separated essences are recombined with the partially concentrated juice may be modified.

Various modifications may be made within the scope of the invention.

I claim:

1. In a process for the concentration of a volatiles-bearing product by a low-temperature, short-time, multi-effect evaporation method, with at least partial forward feed of the process liquid and vapour so that at least from a given stage of evaporation, each subsequent stage of evaporation is carried out at a lower temperature: the improvement of the process comprising the steps of removing the volatile constituents with the vapour from one or more stages at temperatures below the highest temperature effect, and subsequently condensing and recovering these constituents in a separate recovery unit, and then recombining the volatile constituents with the partially concentrated product before at least one final stage of evaporation at a temperature lower than that at which they were originally distilled off whereby a more highly volatile fraction of the recombined volatile constituents and partially concentrated liquid is again removed with the vapour in the said at least one final stage of evaporation.

2. A process as claimed in claim 1, in which the first evaporation stage is in the second effect.

3. A process as claimed in claim 1, in which the product is fruit juice.

4. A process as claimed in claim 1, in which the recombination of the volatile constituents and the partially concentrated product takes place immediately.

5. A process as claimed in claim 4, in which the product is a citrus fruit juice.

6. In apparatus for the concentration of a volatiles-bearing process liquid by a low temperature, short-time multi-effect evaporation, the apparatus comprising a multi-effect evaporator with at least partial forward feed of the process liquid: the improvement of a recovery stage for condensing and recovering volatile constituents from the vapour from at least one effect, and a recombining chamber before at least one final stage of evaporation in which the recovered volatiles from said at least one effect are mixed with the partial concentrate existing at the point just prior to its admission to the final evaporation stage.

* * * * *

UNITED STATES PATENT AND TRADEMARK OFFICE
CERTIFICATE OF CORRECTION

PATENT NO. : 3,959,067
DATED : May 25, 1976
INVENTOR(S) : Ruth Cohn

It is certified that error appears in the above-identified patent and that said Letters Patent are hereby corrected as shown below:

Claim 4, line 3, before the period, insert --prior to the final evaporation stage--.

Signed and Sealed this

Twelfth Day of October 1976

[SEAL]

*Attest:*

RUTH C. MASON
*Attesting Officer*

C. MARSHALL DANN
*Commissioner of Patents and Trademarks*